Jan. 3, 1967  E. A. MALOOF  3,295,578
FASTENING DEVICE
Filed June 29, 1964  5 Sheets-Sheet 1
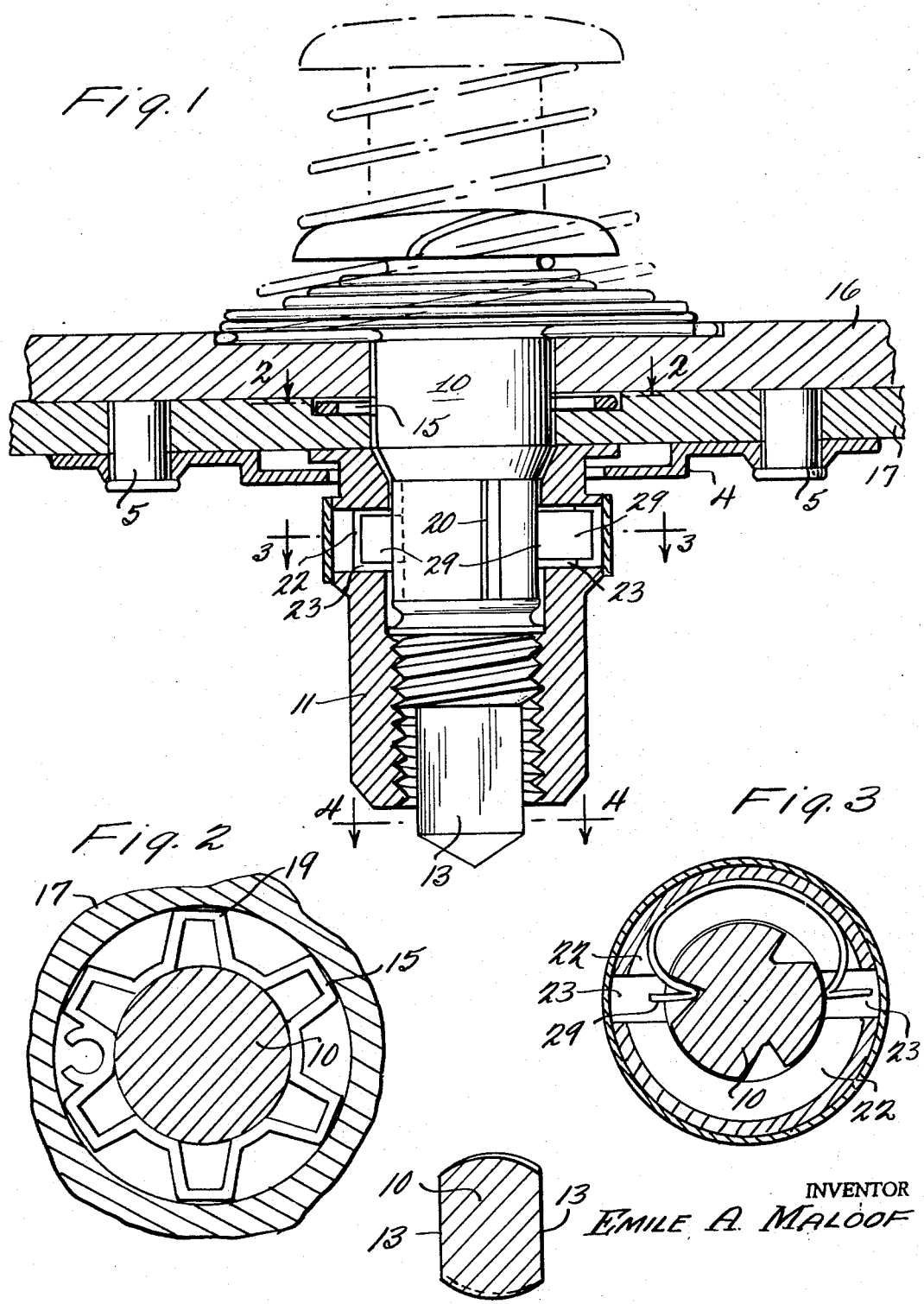
INVENTOR
Emile A. Maloof Jan. 3, 1967  E. A. MALOOF  3,295,578
FASTENING DEVICE
Filed June 29, 1964  5 Sheets-Sheet 2
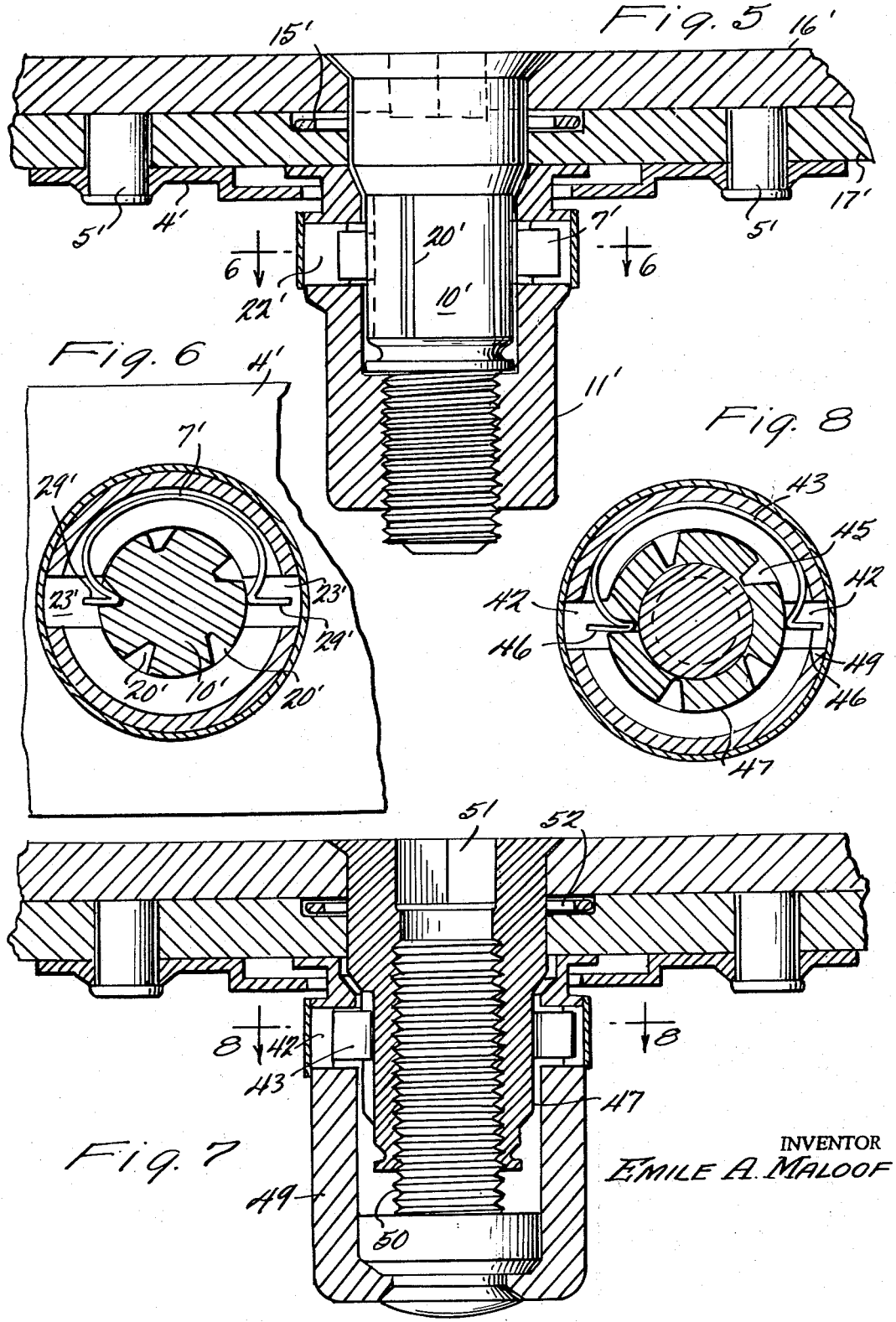
INVENTOR
EMILE A. MALOOF

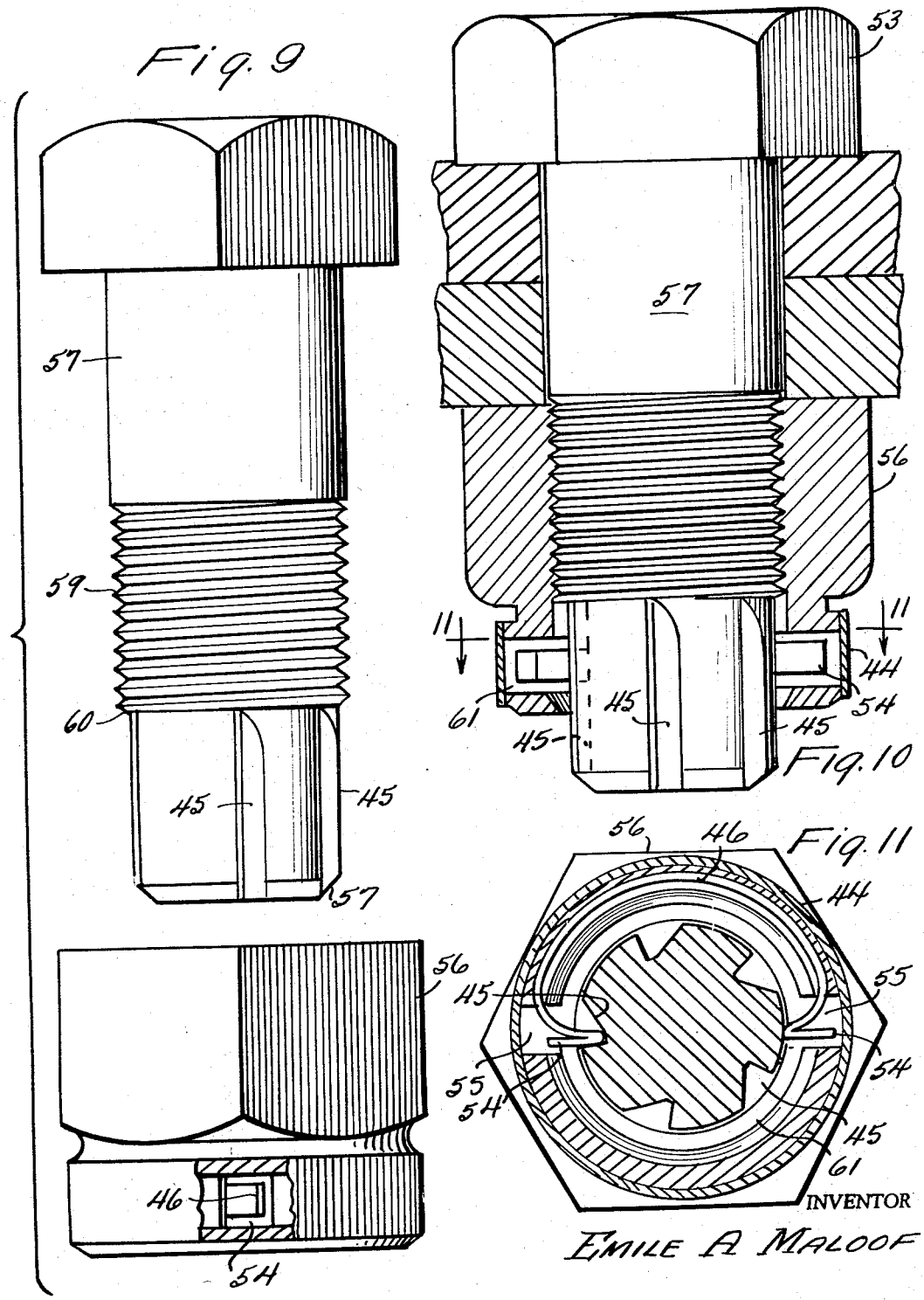

Jan. 3, 1967     E. A. MALOOF     3,295,578

FASTENING DEVICE

Filed June 29, 1964     5 Sheets-Sheet 4

INVENTOR
EMILE A. MALOOF

Jan. 3, 1967   E. A. MALOOF   3,295,578

FASTENING DEVICE

Filed June 29, 1964   5 Sheets-Sheet 5

INVENTOR
EMILE A. MALOOF

3,295,578
FASTENING DEVICE
Emile A. Maloof, 4925 Deal Drive, SE.,
Washington, D.C. 20021
Filed June 29, 1964, Ser. No. 378,815
5 Claims. (Cl. 151—11)

This invention relates to a spring-lock rotary fastner lock nut and bolt.

It is accepted and a known fact that means for a bolt and nut assembly is essential in many applications in which component parts are bolted together. This is especially true of fast moving vehicles, machines and components thereof. Vibrations and other loosening such as shock or explosions or other relative movements between the nut and bolt tends to loosen the tightest bolt and the consequences are sometimes fraught with danger to life and limb, not to mention the vehicle or machine. This is especially true in air travel vehicles such as jet planes and relative type of air planes, etc.

Many forms of locking devices have been proposed, fabricated and used. In some cases the locking feature per se has been found adequate, but other required features have been found to be wanting. For instance the use of a cotter pin to lock a nut to a bolt has proved satisfactory for the purpose. However, this type of locking device does not permit of fine adjustment between the nut and bolt. Moreover, each specific application or installation would require a specially designed bolt having a specially placed cotter pin receiving hole. Aside from the disadvantage is the fact that loosening or tightening, removing and replacing the bolt for any reason becomes a major task, which is time consuming, costly, and often requires special tools and replacing of cotter pins. This type of locking device is cited by way of illustration to indicate other requirements which are essential to a nut and bolt locking element which is lacking in other thread type fasteners.

Reference is now made to bolt and nut fastening often used without the use of cotter pins, by the use of imperfect threads in either the nut or bolt thereby tightening both nut and bolt by means of friction induced by the imperfect thread. This system can, and does prove very costly and dangerous. When unloosened the perfect thread, tappes a perfect thread of the one that was imperfect. Therefore, it cannot be used with safety again and has to be replaced.

In some instances one such requirement is adequately met while with others is not. In other instances another requirement is met but the other remaining requirements are not. It is the principal object of this invention to provide a spring-lock rotary thread fastener, including sleeve bolt and nut assembly, which meets all the requirements of such a device, and suffers from none of the defects and disadvantages of prior devices of like nature. Specifially, the present device is structurally, mechanically and functionally sound. It may be adjusted or modified dimensonally or as to form and in many other respects so as to be adapted for any and all applications or installations in which self locking fasteners are required.

The essential resides in the fact that there is no significant stress upon the locking element. The thread of the male or female unit has not been weakened and can be used an innumerable number of times such as is impossible with a friction fastener or other threaded fasteners which have to be replaced every time they are taken apart or disassembled. This in itself is significant, when used on the stressed panels of jet planes which are highly stressed as they are under tremendous compression.

The economy of using my fastener which does not have to be replaced should prove a great asset economially, as a time saver and in emergency disassembly and reassembling. Briefly stated, the present device comprises a nut and bolt which is coupled with a spring lock. All the stress involved in the use of said device is in the bolt and nut assembly. The spring lock element is not involved in the fastening action. All that it does is to provide a spring urged lock between nut or female unit, and the bolt or male component to prevent relative angular movement between them except when it is desired to loosen or tighten the nut and bolt assembly or to remove the nut from the bolt and replace it thereon. No special tools are required—standard screwdrivers and wrenches in the proper sizes for each operation.

The result is a fastener using nut and bolt or sleeve bolt and nut which is impervious to vibration, shock, or other disruptive forces which would normally tend to cause relative angular movement of the bolt and nut.

Essentially the present device comprises the following elements: A nut having at least one longitudinal or odd number of flutes or grooves formed in its shank across its outer surface, a sleeve bolt adapted for threading and engaging the female unit and a C formed spring mounted through the walls of the sleeve for engagement with said grooves or flutes.

The same general specification applies to the regular bolt and nut with this exception: The grooves or flutes are formed on either the upper or lower portions of the bolt or male unit and the locking device is inserted through the sides of the nut or female unit and engage in the groove formed in the male unit.

The locking spring is to be fabricated of flat or round spring material. The locking grooves or flutes to be formed in 60° angles for easy tightening action and 90° angles for unlocking. The purpose of this is to allow easy taking up or locking clock-wise and backing or untightening resistance counter clockwise. The grooves or flutes to be placed in uneven numbers to make possible double intermediate locking action to wit: for example a fastener made with three grooves would lock six times in 360° cycle. When one point of the C spring is in L groove the opposite and is riding on the perimeter of male unit thereby resulting in multiple locking, and producing the necessary pressure to insure adequate locking.

Regarding reference to the present fastener being impervious to shock and explosion, reference is now made to the grooves or flutes in male unit component of my invention. It is an established fact that fastening of threaded bolts or nuts on critical installations are so done on specific torque requirement to insure proper effective adequate grip recommended by qualified engineers. It is also an established fact that when a nut and bolt assembly is fastened (for example) to 25% yield the bolt has stretched making the assembly more vulnerable to back-off of nut or loosening in the event it has been subjected to shock or explosion or even intense vibration. If the grip is broken and the fastening loosens, and if a cotter pin is used either the cotter pin could break and allow further loosening, or the bolt could break due to the resistance of the cotter pin. Something has to give. All the above does not apply to any bolts or nuts that fail due to faulty material.

Reference is made to my patent recently issued under No. 3,123,119, March 3, 1964.

The essential difference between this present application is that the threads of the bolts have not been interrupted nor do locking grooves pass through the threaded sections plus the addition of the sleeve bolt type fastener, shown on FIGURE 7. In a recent test of the U.S. Navy of nuts and bolts for use of holding down machinery to ship foundations that are subjected to shock due to underwater explosions, etc., the same general type of fastening was used as shown in the present invention and proved adequate under test. To the best information was the only bolt and nut assembly that passed this test 100%. These nuts and bolts had locking grooves in the threaded section as detailed in my patent above referred to. An important feature of my invention is the fact that it is adapted to be interchangeable with conventional nuts and bolts. Thus a conventional nut and bolt assembly may be removed from a given installation and the present spring-lock fastener or nut and bolt assembly substituted in its place, without any alteration or adapating feature in the work. Conversely, the present device may be removed from any given installation and a conventional nut and bolt assembly may be substituted therefor.

The present device is intended to be used in the same manner and with the same tools as a conventional nut and bolt assembly—special tools or special handling are not required. The range of adjustment of the present device to take into account work pieces of various dimensions is precisely the same as is the case with a conventional bolt and nut assembly of corresponding size. The present invention can be used with or without a shield covering the locking unit and an important feature is that the locking device does not have to be disassembled in the unlocking and removal process.

The invention is illustrated in the accompanying drawings in which:

FIGURE 1 is a longitudinal sectional view of a first form of locking device;

FIGURES 2, 3 and 4 are sectional views taken on the lines 2—2, 3—3 and 4—4 of FIGURE 1;

FIGURE 5 is a longitudinal sectional view of a second form of locking device;

FIGURE 6 is a sectional view taken on the line 6—6 of FIGURE 5;

FIGURE 7 is a longitudinal sectional view of a third form of locking device;

FIGURE 8 is a sectional view taken on the line 8—8 of FIGURE 7;

FIGURE 9 is an exploded elevational view of a fourth form of locking device;

FIGURE 10 is a longitudinal sectional view of the device of FIGURE 9 with the parts assembled;

FIGURE 11 is a sectional view taken on the line 11—11 of FIGURE 10;

Figure 12:
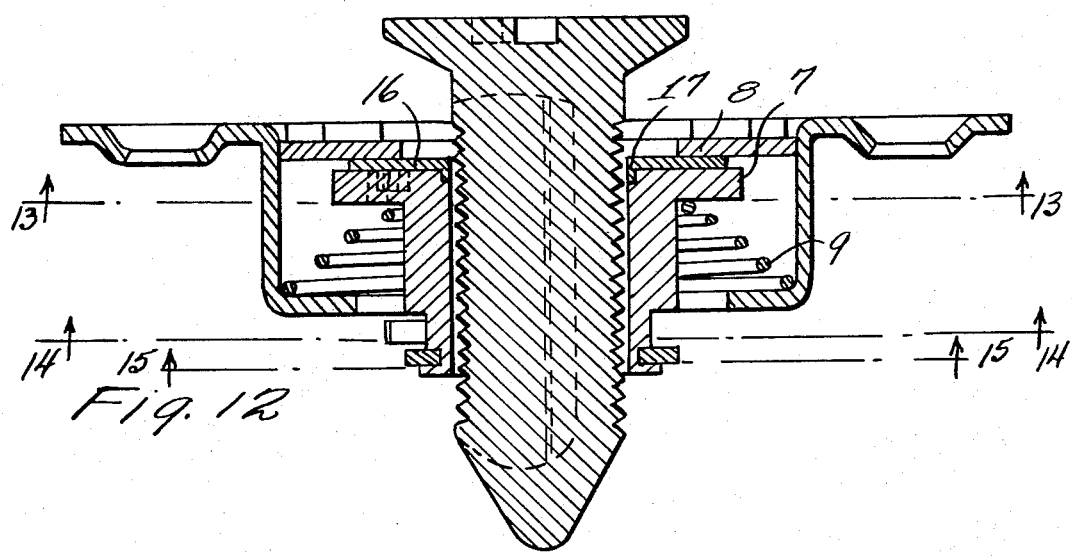
Figure 13:
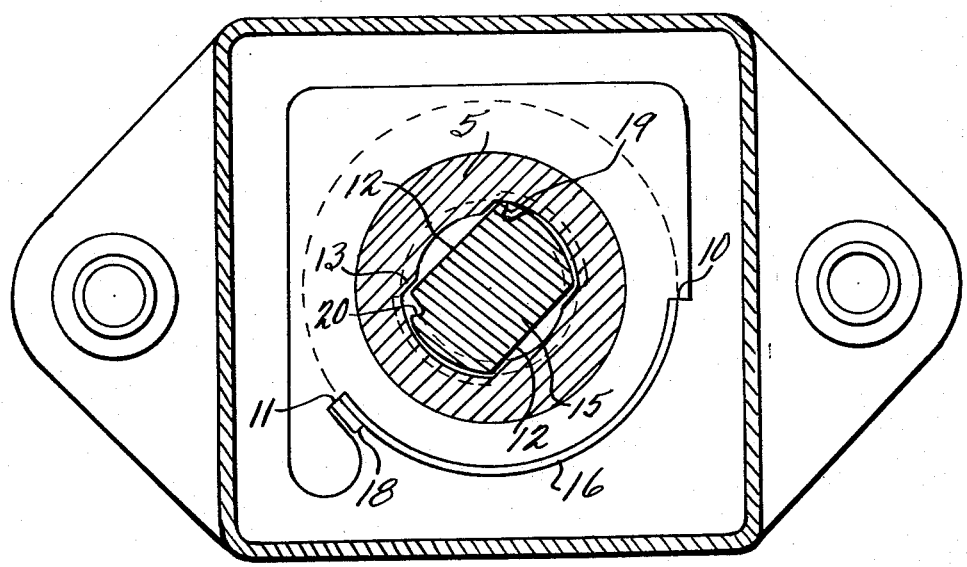
Figure 14:
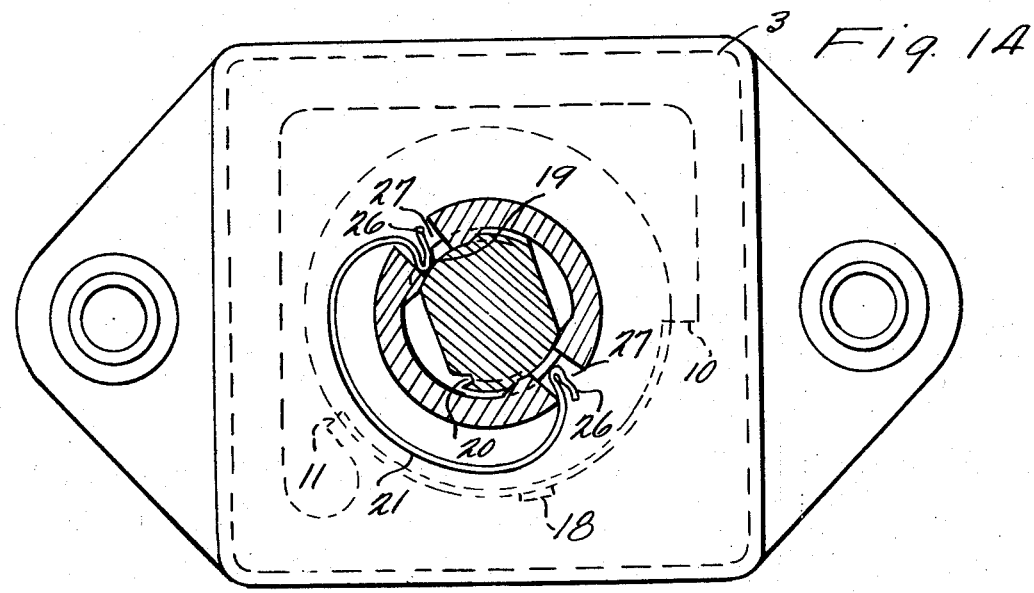
Figure 15:
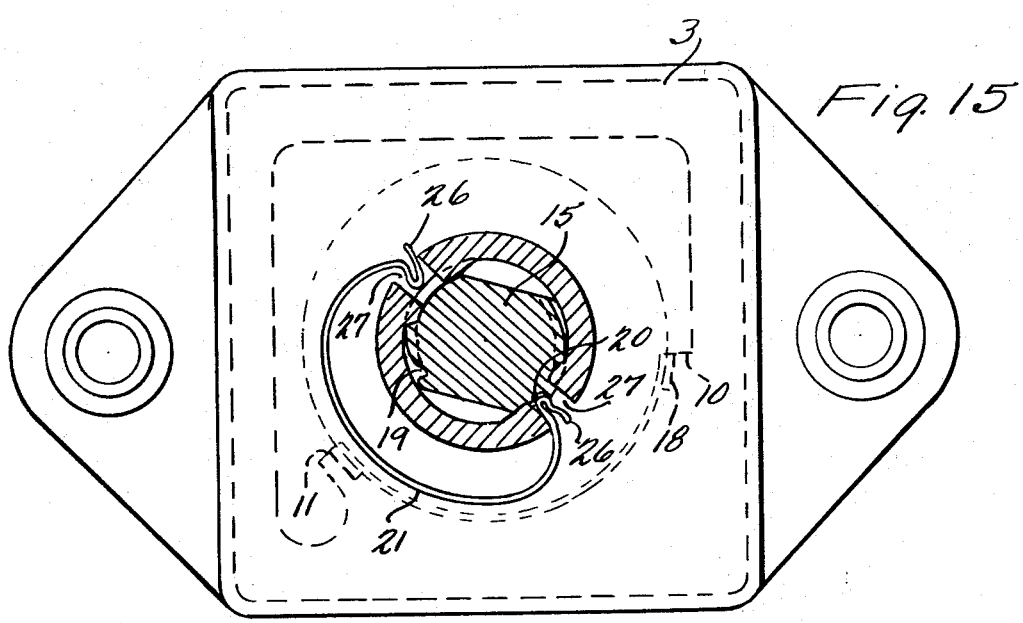

FIGURE 12 is a longitudinal sectional view of a fifth form of locking device; and FIGURES 13, 14 and 15 are sectional views taken on the lines 13—13, 14—14 and 15—15 of FIGURE 12.

Referring to FIGURES 1-4 there is shown a pair of plates 16, 17 fastened together with a locking device which includes a bolt 10 and a nut 11. The shank of the bolt includes an upper smooth portion, a lower threaded portion of smaller diameter and an intermediate portion provided with three longitudinal grooves 20. As seen in FIGURE 3 the grooves are generally V-shaped, having one wall lying in a plane through the diameter of the bolt and another wall inclined with respect to the first wall. Between the grooved portion and the threaded portion of the bolt is an annular groove 1 which is separated from the threaded portion by a thin flange.

The nut assembly includes a mounting plate 4 secured to the plate 17 with rivets 5 and a nut retained in the mounting plate by means of a pair of outwardly extending fingers which are received within corresponding holes within the mounting plate. The lower portion of the nut 11 is interiorly threaded for cooperating with the threaded portion of the bolt. Above the threaded portion of the nut is a peripheral groove 22 having two radial passages 23 communicating with the bore of the nut, which is free of threads in this area. An arcuate spring 7 resides in the groove 22 and is provided at its ends with V-shaped fingers 29 which extend through the radial passages into engagement with the bolt. Each of the fingers 29 is formed with a generally flat wall portion which is parallel to the diametrical groove wall and with a second wall portion angularly intersecting said first wall portion to form a resilient tapered cam.

A spiral retainer spring 8 surrounds the bolt below its head and is connected thereto at one end and to the plate 16 at its other end. When the bolt is tightened the spring is compressed to reside in a single plane within a circular cutout portion in the upper surface of the plate 16.

Another retainer spring 15, which may be used in place of the spiral spring 8, surrounds the bolt and resides in a circular cutout portion in the upper surface of the lower plate 17. As seen in FIGURE 2 this spring 15 has corrugated portions 19 which engage portions of the shank of the bolt 10. When the bolt is loosened it will assume the dotted line position shown in FIGURE 1 whereupon the spring 15 will engage the groove 1 and prevent the bolt from being accidentally lost.

As shown, the bolt 10 is of a fast acting type in which the threads have been removed from two opposed portions 13. The nut 16 is adapted to cooperate with the bolt in the manner fully described in my Patent No. 3,123,119 of March 3, 1964, so that tightening of the bolt may be effected by rotating it 90° with respect to the nut. Also, as will be understood from the patent the fingers 29 cooperate with the grooves 20 in a manner to prevent easy tightening of the bolt but to restrain loosening thereof under shock conditions.

Referring to FIGURES 5 and 6 there is shown a fastening device, similar to the one illustrated in FIGURE 1, except that it is not of the fast acting type. That is, the threads in the nut 11' and on the bolt 10' are continuous and do not have flat portions. The head of the bolt is provided with a socket 25 to receive an Allen wrench or the like and with a retainer spring 15'. In addition the nut is provided with an annular groove 22' and an arcuate spring 7' whose fingers 29' engage longitudinal grooves 20' in the shank of the bolt.

Referring to FIGURES 7 and 8 there is shown a fastening device including a nut 47 having a head which is provided with a wrench-receiving socket 51. The nut extends through two plates which are to be fastened together and threadedly engages the shank 50 of a bolt assembly which is attached to the lower plate by means of a mounting plate similar to that illustrated in FIGURE 1. The threaded shank 50 is secured at its lower end to one end of a sleeve 49 whose upper end is provided with fingers 33 which cooperate with the mounting plate. Intermediate its ends the sleeve 49 is provided with a peripheral groove 44, radial passages 42, and an arcuate spring 43 which cooperate with each other in the manner described above. Adjacent the location of the spring 43, the exterior surface of the nut 47 is provided with a plurality of longitudinal, V-shaped grooves 45 which receive the V-shaped locking fingers 46 of the spring 43. A retainer spring 52, similar to the spring 15 of FIGURE 1, is carried between the plates which are fastened together by the nut and bolt assembly.

Referring to FIGURES 9-11 there is shown an assembly which is similar to those of FIGURES 1 and 5, except that the longitudinally grooved portion of the bolt is disposed at the end of the shank opposite the head. As shown, the bolt has an upper smooth portion 57, a lower portion provided with longitudinal grooves 45 and an intermediate threaded portion 59. The diameter of the grooved portion is less than the diameter of the threaded portion so that the threads of the nut 56 may pass longitudinally over the grooves 45 before engaging the threads 59 of the bolt. The lower end of the nut is provided with a peripheral groove 61, radial passages 55 and an arcuate spring 46, the latter having fingers 54 which cooperate with the grooves 45 in the bolt in the manner described above.

Referring to FIGURES 12–15 there is shown a fast acting locking device which incorporates a means for preventing relative rotation between the bolt and nut of more than 180°. It is apparent that a fast acting fastener in which the bolt shank has two oppositely disposed flat portions, the assembly is completely fastened after 90° of rotation between the bolt and nut. However, rotation beyond 90° disengages some of the cooperating threads, and under some conditions an operator might tighten the bolt beyond 180° so that it would be substantially disengaged.

In FIGURES 12–15 a nut 5 is resiliently held within a mounting plate housing 3 by means of a spiral spring 9. This arrangement permits the nut 5 to be self-aligning with respect to the bolt 15. The upper part of the nut 5 is provided with an outwardly extending flange portion 7 which, as shown in FIGURE 12, is cut away to form a pair of arcuately spaced shoulders 10 and 11. On top of the flange portion 7 there is provided a stop disk 16 which is rotatable with respect to the nut 5. A depending finger 18 on the stop disk 16 is engageable with the shoulders 10 and 11 to prevent rotation of the disk except through the arc between the shoulders 10 and 11. The stop disk 16 is further provided with a central aperture whose wall has two opposed flat portions and two opposed arcuate portions, the arcuate portions having depending flanges 17. The spring 9 urges the nut 5 and the disc 16 upwardly toward the inner surface of the housing 3.

The bolt 15 is provided with exterior threads 13 and with longitudinal grooves 19 and 20 which extend through the threads. The bolt is also provided with opposed flat portions 12 so that it may be removed longitudinally with respect to the nut 5 when the corresponding flat portions of the latter are arranged in circular relation to the flat portions of the bolt. The grooves 19 and 20 cooperate with the fingers 26 of a spring 21 which is carried in a peripheral groove 22 at the lower end of the nut 5, in the manner described above. The fingers project through radial passages 27.

In operation of the assembly of FIGURES 12–15 the bolt is inserted through the stop disk 16 and into the nut 5, the flat portions of the bolt loosely engaging the flat sides of the central aperture in the stop disk 16. This relationship is illustrated in FIGURE 13 and shows that the finger 18 on the stop disk 16 is in engagement with the shoulder 11 on the flange 7 of the nut 5. Upon rotation of the bolt, as seen in FIGURES 14 and 15, the stop disk 16 rotates with the bolt while the nut 5 remains stationary. Accordingly, the finger 18 moves away from the shoulder 11 toward the shoulder 10 and, simultaneously, the threads of the bolt and nut engage each other. At full engagement of the threads the finger 18 engages the shoulder 10 and prevents further rotation of the stop disk 16. This in turn prevents further rotation of the bolt because of the engagement of the flat portions of the latter with the flat portions of the aperture in the stop disk 16. This relationship is shown in FIGURE 15.

While the embodiment of FIGURES 12–15 shows the grooves 19 and 20 extending through the bolt threads, it will be understood that the locking grooves may be longitudinally spaced from the threads as in FIGURES 1 and 5.

Modifications of this invention will occur to those skilled in the art and, accordingly, it is not intended that the above described details be limiting except as they appear in the appended claims.

What is claimed is:

1. A fastener for securing together two members having aligned apertures comprising: an exteriorly threaded bolt; a cylindrical sleeve member surrounding said bolt in spaced relationship thereto and being attachable to one of the members so as to be axially aligned with the apertures in the members; means connecting one end of the bolt to said sleeve for preventing relative movement between said bolt and sleeve; said sleeve having a peripheral groove in its exterior adjacent the end thereof nearest said one plate and at least one radial passage extending between said groove and the interior of said sleeve; an arcuate spring carried in said groove, said spring having a yieldable locking finger extending loosely through said radial passage and biased by said spring inwardly beyond the interior of said sleeve, said locking finger terminating in two angularly intersecting walls; an interiorly threaded tubular nut insertable through the apertures in the members for cooperatively engaging said bolt, said nut having a longitudinal portion with a maximum transverse diameter less than the internal diameter of said sleeve, said longitudinal portion having at least one longitudinal groove therein defined by intersecting walls which receive the walls of said locking finger in camming engagement in one rotative position of said nut in a manner to permit rotation of said nut in a tightening direction while resisting but not completely preventing rotation of said nut in a loosening direction.

2. A fastener as in claim 1 including a mounting surrounding one end of said sleeve member for loosely mounting said sleeve member to one of the members to be fastened together, said mounting plate having an aperture therein in which said sleeve fits loosely, said sleeve having a flange thereon which prevents removal of said sleeve through said aperture.

3. A fastener as in claim 1 wherein the walls of said longitudinal groove in said nut include a wall lying in a generally diametrical plane with respect to the nut axis and another wall angularly related thereto, the walls of said finger including a generally flat wall which is substantially parallel to the diametrical groove wall and a second wall angularly intersecting said flat wall to form a resilient cam, thereby permitting rotation of the nut in one direction while resisting but not completely preventing rotation of the nut in the opposite direction.

4. A fastener as in claim 3 wherein said longitudinal portion of said nut is provided with a plurality of longitudinal grooves and wherein said arcuate spring terminates at each end in a locking finger.

5. A fast acting nut and bolt assembly comprising: a bolt having a shank which is provided with a pair of oppositely disposed longitudinally extending flat portions, the portions between said flat portions being threaded; a housing having a pair of aligned openings for passage of said bolt therethrough; a nut having a central opening therethrough, the wall of said opening having alternate arcuate portions and flat portions, the arcuate portions being free of threads, the bolt being adapted to move axially through the nut when the flat portions of said bolt and said nut are maintained in parallel relation to each other, thereby providing for quick adjustment of the nut relative to the bolt, said nut being completely engaged with the threads of the bolt when relative rotational movement to 90° is effected between said bolt and nut, said nut terminating at one end in a radially extending flange, the periphery of which defines two arcuately spaced stop shoulders, said nut being disposed in said housing in general alignment with said openings; a disk having a central aperture which is complementary to said bolt shank, said disk having a finger extending out of the plane of said disk and engageable with either of said stop shoulders on said flange so as to limit relative rotation between said disk and said nut to the arcuate spacing between said stop shoulders, said facing defining an arc of substantially 90°, said disk being disposed in said housing between the outer end surface of said flange and the inner surface of said housing, the central aperture being in general alignment with said openings; a compression spring in said housing and surrounding said nut, said spring engaging the surface of the said flange opposite said disk, thereby urging said nut and said disk toward the inner surface of said housing and thereby resiliently holding said nut so that the nut is self-aligning with said bolt when the latter is first inserted, said nut being further characterized by having a circumferential peripheral groove and two spaced apart radial passages extending between said circumferential groove and the central opening of said nut, each threaded portion of the shank of said bolt being provided with a longitudinal groove having a first flat wall lying in a plane passing generally diametrically through the bolt axis and a second flat wall lying at an angle to said first wall, said assembly further including a generally arcuate spring disposed in said circumferential groove and having V-shaped bends adjacent the ends thereof which project into said longitudinal grooves when said bends are aligned therewith, each of said bends including a generally flat portion which is substantially parallel to said first flat wall and a second portion angularly intersecting said first flat portion to form a resilient cam, thereby permitting rotation of the nut in one direction but resisting rotation of the nut in the opposite direction.

References Cited by the Examiner

UNITED STATES PATENTS

| | | | |
|---|---|---|---|
| 1,168,613 | 1/1916 | Eberly | 151—11 |
| 2,396,142 | 3/1946 | Allen | 151—69 |
| 2,398,827 | 4/1946 | Graham et al. | 151—11 |
| 2,850,781 | 9/1958 | Pachmayr | 151—69 |
| 2,853,112 | 9/1958 | Poupitch | 151—69 |
| 2,922,211 | 1/1960 | Boyd | 151—69 |
| 2,991,816 | 7/1961 | Harbison et al. | 151—69 |
| 3,123,119 | 3/1964 | Maloof | 151—11 |
| 3,180,388 | 4/1965 | Newcomer et al. | 151—69 |
| 3,192,980 | 7/1965 | Sauter | 151—69 |

FOREIGN PATENTS

| | | |
|---|---|---|
| 664,962 | 1/1952 | France. |
| 440,554 | 12/1948 | Italy. |

CARL W. TOMLIN, *Primary Examiner.*

R. S. BRITTS, *Assistant Examiner.*